United States Patent [19]

Murata et al.

[11] Patent Number: 5,619,322
[45] Date of Patent: Apr. 8, 1997

[54] METHOD OF ADJUSTING OPTICAL AXIS OF HEADLIGHT OF VEHICLE

[75] Inventors: Nagatoshi Murata; Hisaya Ooiwa; Takeshi Masaki, all of Sayama, Japan

[73] Assignee: Honda Giken Kogyo Kabushiki Kaisha, Tokyo, Japan

[21] Appl. No.: 411,977

[22] Filed: Mar. 28, 1995

[30] Foreign Application Priority Data

Aug. 22, 1994 [JP] Japan .................................. 6-197026
Feb. 15, 1995 [JP] Japan .................................. 7-026738

[51] Int. Cl.⁶ .................................................. H05B 37/00
[52] U.S. Cl. ........................ 356/121; 356/122; 356/153; 356/123
[58] Field of Search ................... 356/121, 122, 356/123, 153, 154, 394

[56] References Cited

U.S. PATENT DOCUMENTS

| | | | |
|---|---|---|---|
| 4,632,545 | 12/1986 | Schael | 356/121 |
| 4,634,275 | 1/1987 | Yoshida et al. | |
| 5,373,357 | 12/1994 | Hopkins et al. | |
| 5,379,104 | 1/1995 | Takao | 356/121 |
| 5,392,111 | 2/1995 | Murata et al. | 356/121 |

FOREIGN PATENT DOCUMENTS 3-103743  4/1991  Japan .
4-25741   1/1992  Japan .
2151354  10/1984  United Kingdom .

OTHER PUBLICATIONS

United Kingdom Search Report dated Nov. 15, 1995 of Great Britain Application No. GB 9507417.5 citing above listed references.

*Primary Examiner*—Georgia Y. Epps
*Assistant Examiner*—Reginald A. Ratliff
*Attorney, Agent, or Firm*—Armstrong, Westerman, Hattori, McLeland & Naughton

[57] ABSTRACT

That illuminating pattern of the headlight which appears on a screen disposed in front of the vehicle is pictured. The optical axis of the headlight is adjusted based on an image of the illuminating pattern. A distribution of illuminance of the illuminating pattern along a scanning line which bridges a light portion and a dark portion of the image of the illuminating pattern is measured. A position of a reference point which serves as a reference in adjusting the optical axis is obtained from that point on the scanning line which corresponds to a crossing point of a first straight line and a second straight line. The first straight line is obtained from a portion corresponding at least to one of the light portion and the dark portion of a curve which represents the measured distribution of illuminance. The second straight line is obtained from a portion corresponding to a transient region which is positioned between the light portion and the dark portion.

6 Claims, 3 Drawing Sheets

METHOD OF ADJUSTING OPTICAL AXIS OF HEADLIGHT OF VEHICLE

BACKGROUND OF THE INVENTION

1. Field of the Invention

The present invention relates to a method of adjusting an optical axis of a headlight of a vehicle such as a motor vehicle or the like.

2. Description of Related Art

As this kind of method, there has hitherto been known one as disclosed in Japanese Published Unexamined Patent Application No. 103743/1991 and Japanese Published Unexamined Patent Application No. 25741/1992, in which the following are disclosed. Namely, a screen is disposed in front of a vehicle. That illuminating pattern of a headlight which appears on the screen is pictured to obtain a rate of change or an amount of change in illuminance of the illuminating pattern from a vertically upper side in the direction from a dark portion towards a light (i.e., bright) portion of the image of the illuminating pattern. The position at which the rate of change or the amount of change becomes a predetermined value is defined as a light/dark border point. Based on the light/dark border point or a light/dark border line which is formed by connecting light/dark border points, the orientation or the direction of an optical axis of the headlight is measured to thereby adjust the optical axis.

The border between the light portion and the dark portion is likely to be subject to the influence of noises and, consequently, the position at which the rate of change or the amount of change in luminous intensity on the border attain the predetermined value will vary. Therefore, the position on the light/dark border point that can be obtained in the above-described conventional method will deviate each time the measurement is made even if the measurement is repeated without moving the vehicle. It is thus difficult to unambiguously or unequivocally locate the light/dark border point. It follows that an adjustment of the optical axis based on this kind of light/dark border point will not lead to an accurate adjustment of the optical axis.

In view of the above-described points, the present invention has an object of providing a method in which the orientation or the direction of the optical axis can be accurately adjusted by making a point that is not subject to the influence of noises as a reference point.

SUMMARY OF THE INVENTION

In order to attain the above and other objects, a first feature of the present invention is a method of adjusting an optical axis of a headlight of a vehicle comprising: picturing that illuminating pattern of the headlight which appears on a screen disposed in front of the vehicle; and adjusting the optical axis of the headlight based on an image of the illuminating pattern; wherein the improvement comprises: measuring a distribution of illuminance of the illuminating pattern along a scanning line which bridges a light (i.e., bright) portion and a dark portion of the image of the illuminating pattern; and obtaining a position of a reference point which serves as a reference in adjusting the optical axis from that point on the scanning line which corresponds to a crossing point of a first straight line and a second straight line, the first straight line being obtained from a portion corresponding at least to one of the light portion and the dark portion of a curve which represents the measured distribution of illuminance, the second straight line being obtained from a portion corresponding to that transient region of the curve which is positioned between the light portion and the dark portion.

A second feature of the present invention is a method of adjusting an optical axis of a headlight of a vehicle comprising: picturing that illuminating pattern of the headlight which appears on a screen disposed in front of the vehicle; and adjusting the optical axis of the headlight based on an image of the illuminating pattern; wherein the improvement comprises: measuring a distribution of illuminance of the illuminating pattern along a scanning line which bridges a light portion and a dark portion of the image of the illuminating pattern; obtaining a position of a reference point which serves as a reference in adjusting the optical axis from that point on the scanning line which attains a predetermined ratio of illuminance relative to a maximum value of illuminance of the measured illuminance; and changing the ratio depending on a rate of change in illuminance.

Since the light portion and the dark portion of the image of the illuminating pattern is hardly subject to the influence of the noises, the first straight line according to the first feature of the present invention can be unambiguously obtained. On the other hand, though the position at which the ratio of change or the amount of change in illuminance becomes a predetermined value varies in the transient region, the second straight line that is obtained from the entire transient region is less likely to be affected by locally abnormal values due to noises in the ratio of change or the amount of change in illuminance. Therefore, the second straight line can be obtained almost unambiguously.

For example, if the first straight line is defined to be a line of minimum inclination tangential to the curve in a portion corresponding to the light portion or the dark portion, and the second straight line is defined to be a line of maximum inclination tangential to the curve in the transient region, the first straight line becomes substantially horizontal even if there are some noises, because the light portion and the dark portion are both stable in illuminance. On the other hand, the point at which the inclination of the tangential line in the transient region becomes maximum is a point of inflection of the curve. Even if the point of inflection may deviate to some degree along the curve, the position of the tangential line to pass through the point of inflection makes little or no change. Therefore, the crossing point of the first straight line and the second straight line always lies in a certain fixed position without being affected by the noises or the like.

It follows that the point on the scanning line which corresponds to the crossing point will not deviate even in repeated measurements. Though the above-described point does not correspond to the light/dark border point that can be recognized by the naked eye, the deviation between the position of the above-described point and the position of the light/dark border point can be obtained by predetermined formulas that have a parameter of the inclination angle of the second straight line or of the maximum value of the illuminance in the curve. Accordingly, the position of the light/dark border point can be obtained by correcting the coordinates of that point on the scanning line which corresponds to the crossing point, based on the inclination angle or the maximum illuminance. The light/dark point that has been obtained in this manner will not deviate even in repeated measurements. The adjustment of the optical axis can thus be carried out at a higher accuracy by making this light/dark border point as a reference point. Further, the adjustment of the optical axis can also be carried out by making that point itself on the scanning line which corresponds to the crossing point, as a reference point.

By the way, it may also be considered to obtain the reference point which is the light/dark border point, from a point having a luminous intensity that is predetermined percent of the maximum value of the illuminance. In this case, the change in illuminance in the transient region becomes sharp in a lighter portion which is closer to the optical axis. On the other hand, at a portion which is away outwards from the optical axis, the maximum value of the illuminance becomes smaller and the contrast becomes blurred, with the result that the change in illuminance in the transient region becomes gradual or smaller. If the rate of the illuminance to the maximum value of the illuminance is thus set to be constant even if the sharpness or gradualness in the change in illuminance in the transient region may change, the point having that rate of illuminance will no longer coincide with the light/dark border point that can be recognized by the naked eye. Here, the light/dark border point that can be recognized by the naked eye becomes a point that has a relatively small rate of illuminance as compared with the maximum value of the illuminance when the rate of change in illuminance is small and, when the rate of change of illuminance is large, becomes a point that has a relatively larger rate of illuminance as compared with the maximum value of the illuminance.

Therefore, as in the second feature of the present invention, the reference point coinciding with the light/dark border point that can be recognized by the naked eye, can be obtained by changing the rate of illuminance of the reference point relative to the maximum value of the illuminance depending on the ratio of change in illuminance.

By the way, the inclination of a straight line that can be obtained at a portion corresponding to a transient region which is positioned between the light portion and the dark portion of a curve representing the measured distribution of illuminance has a correlation with the ratio of change in illuminance. Therefore, the above-described rate can be calculated with the inclination serving as a parameter to show the ratio of change in illuminance.

BRIEF DESCRIPTION OF THE DRAWINGS

The above and other objects and the attendant advantages of the present invention will become readily apparent by reference to the following detailed description when considered in conjunction with the accompanying drawings wherein.

DETAILED DESCRIPTION OF A PREFERRED EMBODIMENT

Figure 1:
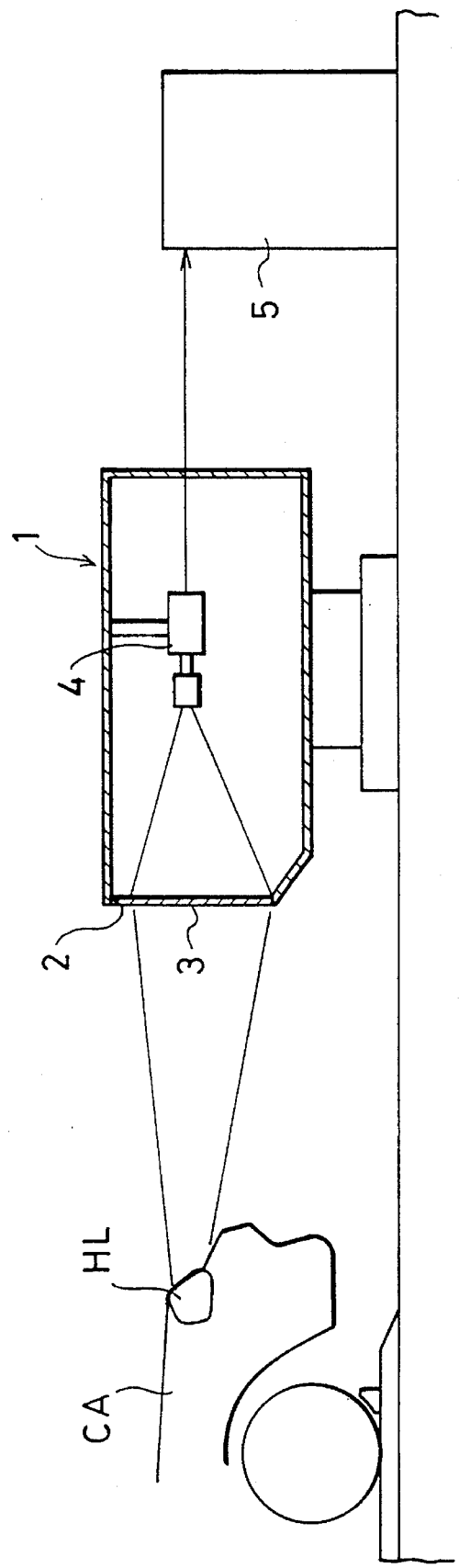
FIG. 1 is a schematic arrangement diagram showing one example of an apparatus for measuring an optical axis which is used in the present invention.

With reference to FIG. 1, numeral 1 denotes a main body of a measuring apparatus for measuring the orientation or the direction of an optical axis. This measuring apparatus is disposed about 3 m ahead of a headlight HL of a motor vehicle CA which is stopped in a fixed position. The method of the present invention is carried out by using this measuring apparatus. The main body 1 is of a box shape having an opening 2 in the plane that faces or opposes the headlight HL. The opening 2 is covered by a translucent (i.e., semi-transparent) screen 3 which is made of a piece of ground glass or the like. That illuminating pattern of the headlight HL which is radiated or thrown on the semitransparent screen 3 is pictured by a CCD (Charge-coupled Device) camera 4 which is mounted inside the main body 1. The pictured image data are transmitted to an image processing device 5 and the following image processing is carried out.

Figure 2:
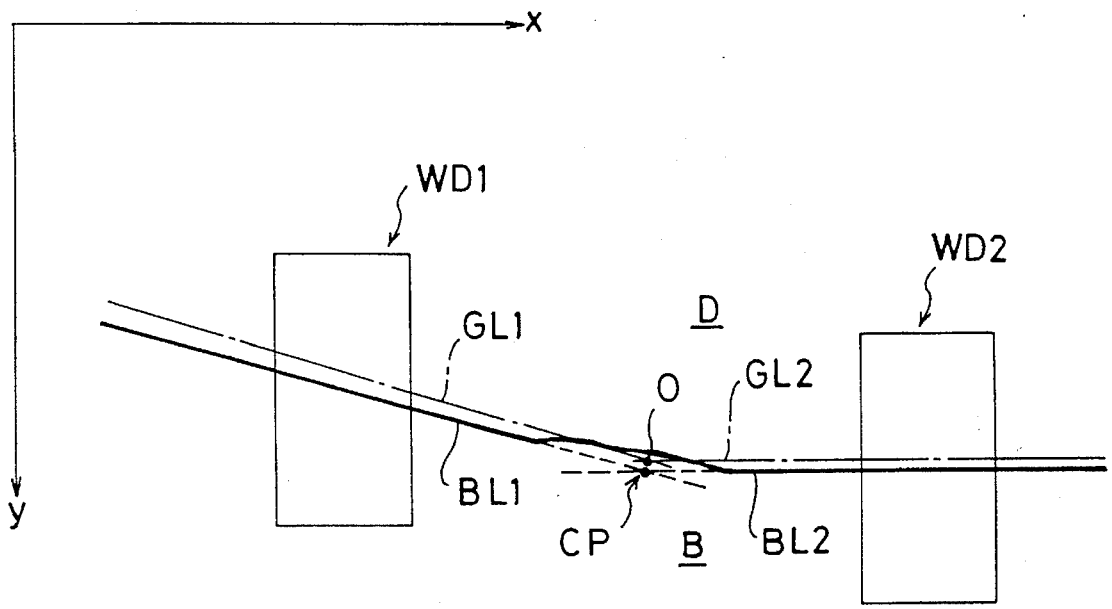
FIG. 2 is a diagram showing an illuminating pattern of the headlight.

An explanation will now be made about the contents of the image processing in the image processing device 5 by referring to FIG. 2, which represents an image when a cutoff type headlight is used as the headlight HL and the headlight is radiated in a so-called low-beam condition. As shown in FIG. 2, the light/dark border line which defines the light or bright portion B upon which the light from the headlight HL is radiated and the dark portion D upon which no light is radiated is made up, in the case of the cutoff type headlight, of a straight light/dark border line BL1 which is inclined at an angle of about 15° and a horizontal straight light/dark border line BL2. A bent point on the light/dark border line is defined as a cutoff point CP, and the position of the cutoff point CP is obtained by image processing. Depending on whether the position of the cutoff point CP is in a normal position or not, the optical axis of the headlight HL is adjusted to the normal or correct direction.

By the way, the neighborhood of the cutoff point CP will not clearly appear on the semitransparent screen 3 as a result of the effect of noises due to halation or the like. As a solution, windows WD1, WD2 for measurement purpose are set in portions which are laterally away (i.e., in the x-axis direction) by a predetermined distance from the point at which the cutoff point CP is supposed to be present and in which both the light/dark border lines BL1, BL2 are straight. The light/dark border lines BL1, BL2 in the respective windows WD1, WD2 are converted into formulas as straight lines. There are then obtained, from both the formulas, the coordinates of the cutoff point CP which is the crossing point of the light/dark lines BL1, BL2. The method of converting the light/dark border lines BL1, BL2 into formulas is as follows. Namely, the image data inside the respective windows WD1, WD2 are scanned along scanning lines in the vertical direction (i.e., in the y-axis direction) at a plurality of points which lie in the x-axis direction. The position of light/dark border point on each of the scanning lines is obtained and straight lines to pass through the light/dark border points are defined to be the light/dark border lines BL1, BL2.

Figure 3:
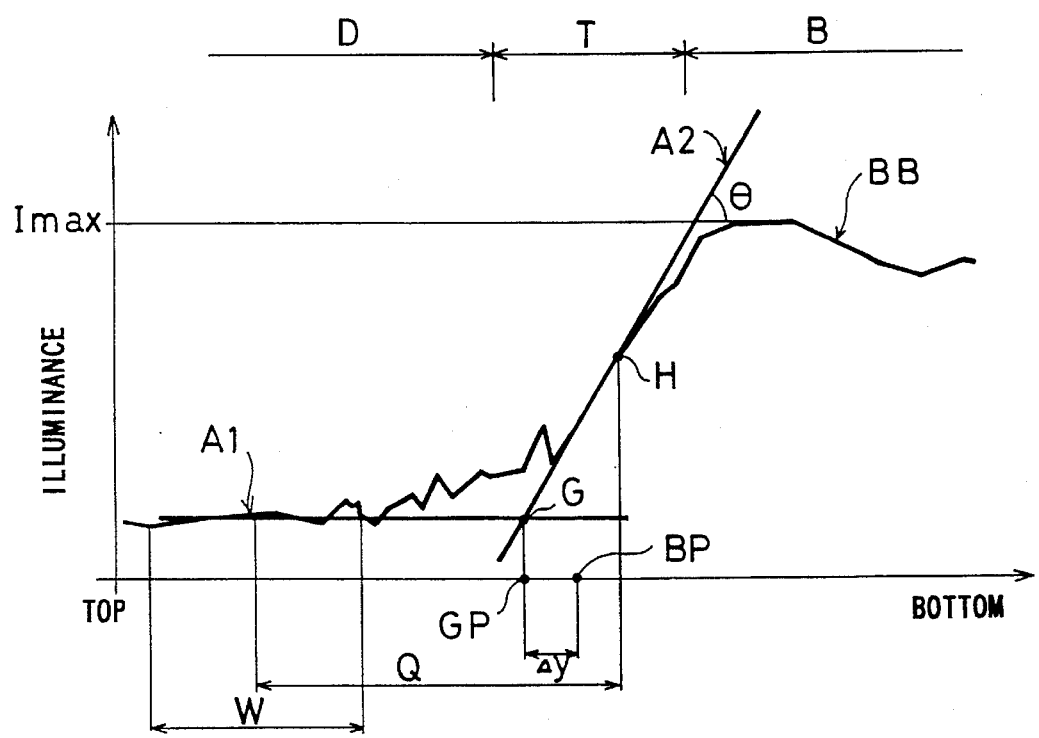
FIG. 3 is a diagram explaining a method of obtaining a position of a reference point.

One example of data to be obtained by scanning along the scanning line in the y-axis direction is shown in FIG. 3, in which the ordinate represents the illuminance and the abscissa represents the position on the scanning line. Line BB is a curve which represents the distribution of illuminance. The upper side (i.e., top) in the y-axis direction falls within the dark portion D and is therefore low in the level of luminous intensity. The level of luminous intensity increases towards the lower side (i.e., bottom), with the result that the level of the luminous intensity becomes maximum within the light portion B. Alphabet T denotes a transient region in which the dark portion D is in a process of transforming into the light portion B.

First, the inclination of the curve BB at each of the coordinates in the abscissa is obtained by a method of least squares or the like as an average inclination of the curve BB within a range of a predetermined width about each of the coordinates. The above-described width is set in such a size as will eliminate the effect of noises that are likely to occur in a portion bridging the dark portion D and the transient region T. Then, there is obtained a straight line A2 (a second straight line) which is tangential to the curve BB at point H where the inclination is maximum. Further, a range W is set about a point which is offset, by a predetermined distance Q from the point H, to the side of the dark portion. There is obtained, by the method of least squares, a straight line A1 (a first straight line) which is close to or similar with the curve BB within this range W. There are then obtained coordinates of that point GP on the scanning line which corresponds to the crossing point G of both the straight lines A1, A2.

This point GP can be unambiguously located without being influenced by the noises and, therefore, the optical axis of the headlight HL can be accurately adjusted based on this point GP. Distances Q, W as shown in FIG. 3 may be adequately set depending on the kind of the headlight HL.

By the way, the point GP does not coincide with a light/dark border point BP that is recognized by the naked eye. Lines to pass through a plurality of points GP that are respectively obtained in each of the windows WD1, WD2 will become GL1, GL2 as shown in FIG. 2 and will thus deviate from the light/dark border lines BL1, BL2 that can be recognized by the naked eye. Here, the line GL2 at the horizontal portion of the illuminating pattern becomes horizontal and, therefore, it will coincide with the light/dark border line BL2 at the horizontal portion if it is parallelly moved in the y-axis direction by a predetermined distance depending on the kind of the headlight. But the line GL1 at the inclined portion is inclined relative to the light/dark border line BL1 and does not coincide with the line BL1 even if it is parallelly moved. However, it has been found out, as a result of experiments, that the deviation in the y-axis direction $\Delta y$ between the point GP and the light/dark border point BP at the inclined portion can be expressed by the following formula by defining the distance in the x-axis direction from the cutoff point CP to be L $$\Delta y = \alpha_1 \cdot L + \beta_1 \quad (1)$$

where $\alpha_1$ and $\beta_1$ are constants.

Here, though L is unknown, it has been found out upon checking the relationship between L and the inclination $\theta$ of the straight line A2 that $\theta$ decreases linear-functionally with the increase in L, namely, the following formula has been fount out to be established between L and $\theta$ $$L = \alpha_2 \cdot \theta + \beta_2 \quad (2)$$

where $\alpha_2$ and $\beta_2$ are constants.

By substituting formula (2) in formula (1), the following formula can be obtained $$\begin{aligned}\Delta y &= \alpha_1 \cdot \alpha_2 \cdot \theta \cdot \alpha_1 \cdot \beta_2 + \beta_1 \\ &= \alpha \cdot \theta \cdot \beta\end{aligned} \quad (3)$$

where $\alpha = \alpha_1 \cdot \alpha_2$, $\beta = \alpha_1 \cdot \beta_2 + \beta_1$.

Therefore, if the values $\alpha$ and $\beta$ are empirically obtained for each kind of headlight, the y coordinate of the light/dark border point BP can be calculated by correcting the y coordinate of the point GP by an amount of the deviation $\Delta y$ that can be obtained by the formula (3). In the horizontal portion of the illuminating pattern, $\theta$ becomes equal to each other at each position in the x-axis direction. Consequently, $\Delta y$ becomes constant and the light/dark border point BP can be obtained by offsetting the point GP by a predetermined amount in the y-axis direction. Then, by converting the light/dark border lines BL1, BL2 into formulas from the light/dark border points BP in the inclined portion and the horizontal portion, the coordinates of the cutoff point CP can be obtained.

Further, it has been found out that a predetermined equation can also be established between the maximum illuminance Imax of the curve BB and the distance L. Accordingly, y-axis coordinate of the light/dark border point BP at the inclined portion can also be obtained by obtaining $\Delta y$ from Imax.

A predetermined correlation also exists between the crossing point 0 of both the lines GL1, GL2 that pass through the points GP and the cutoff point CP. Therefore, it is possible to let the cutoff point CP fall within a predetermined acceptable range also by making an adjustment of the optical axis on the basis of the crossing point 0. However, in order to enable to visually confirm the adjusting conditions of the optical axis, it is preferable to indicate the light/dark border lines BL1, BL2 and the cutoff point CP on a monitor. For that purpose, it becomes necessary to convert the light/dark border lines BL1, BL2 into formulas by obtaining the light/dark border points BP from the points GP as described above.

Figure 4:
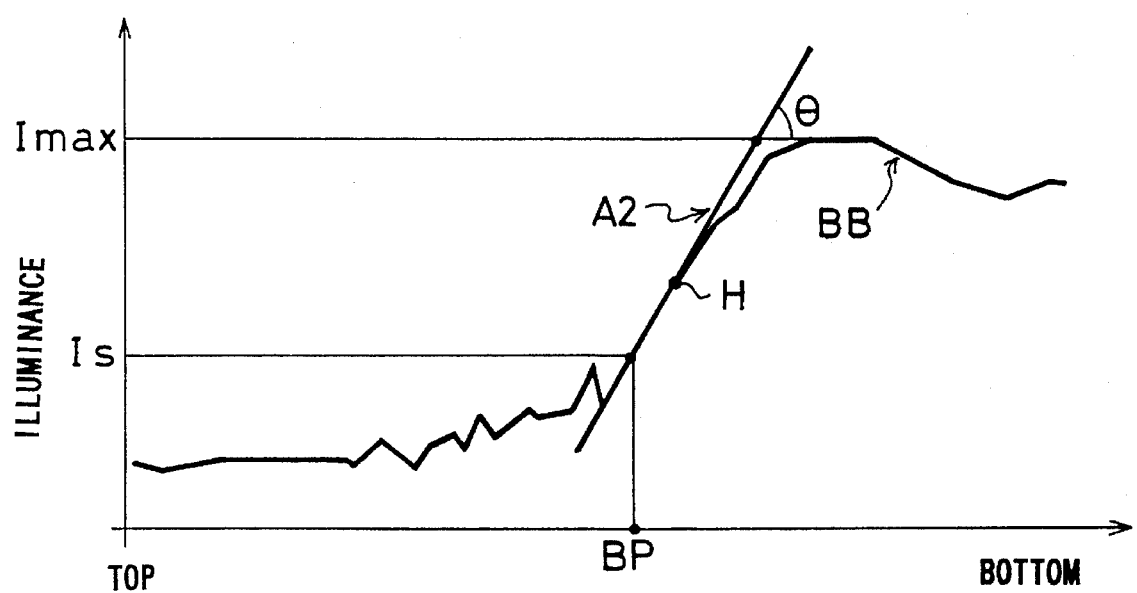
FIG. 4 is a diagram explaining another method of obtaining a position of the reference point.

An explanation will now be made about another embodying example with reference to FIG. 4. In this example, as the light/dark border point BP, there is defined such a point on the scanning line as will have a predetermined ratio f of illuminance Is (Is=f·Imax) relative to the maximum value of illuminance Imax on the curve BB which represents the distribution of illuminance on the scanning line in the y-axis direction. However, the light/dark border point BP changes its correlation with the point at which the illuminance becomes maximum, depending on the contrast between the light portion B and the dark portion D. Therefore, the above-described ratio f must also be changed depending on the condition of contrast. The condition of the contrast appears in whether the rise in the transient range is steep or gradual. Therefore, like in the above-described embodying example shown in FIG. 3, there is obtained, for example, the inclination angle $\theta$ of the straight line A2 which is tangential to the curve BB at the point H of maximum inclination, thereby changing the above-described ratio f depending on the inclination $\theta$.

Then, from the light/dark border point BP obtained as described above, the light/dark border lines BL1, BL2 in FIG. 2 are converted into formulas to obtain the position of the cutoff point CP, thereby carrying out the adjustment of the optical axis.

As described hereinabove, according to the present invention, since the adjustment of the optical axis is carried out by measuring the direction of the optical axis based on the reference point that is not affected by the noises, an accurate adjustment of the optical axis can be made.

It is readily apparent that the above-described method of adjusting an optical axis of a headlight of a vehicle meets all of the objects mentioned above and also has the advantage of wide commercial utility. It should be understood that the specific form of the invention hereinabove described is intended to be representative only, as certain modifications within the scope of these teachings will be apparent to those skilled in the art.

Accordingly, reference should be made to the following claims in determining the full scope of the invention.

What is claimed is:

1. A method of adjusting an optical axis of a headlight of a vehicle comprising:

picturing that illuminating pattern of the headlight which appears on a screen disposed in front of the vehicle; and adjusting the optical axis of the headlight based on an image of the illuminating pattern;

wherein the improvement comprises:

measuring a distribution of illuminance of the illuminating pattern along a scanning line which bridges a light portion and a dark portion of the image of the illuminating pattern; and obtaining a position of a reference point which serves as a reference in adjusting the optical axis from that point on the scanning line which corresponds to a crossing point of a first straight line and a second straight line, said first straight line being obtained from a portion corresponding at least to one of the light portion and the dark portion of a curve which represents the measured distribution of illuminance, said second straight line being obtained from a portion corresponding to that transient region of the curve which is positioned between the light portion and the dark portion.

2. A method of adjusting an optical axis of a headlight according to claim 1, wherein the first straight line is a line of minimum inclination tangential to the curve in a portion corresponding to the light portion or the dark portion, and wherein the second straight line is a line of maximum inclination tangential to the curve in the transient region.

3. A method of adjusting an optical axis of a headlight according to claim 1 or 2, further comprising the steps of:

obtaining an inclination angle of the second straight line; and obtaining a position of a light/dark border point which defines a border between the light portion and the dark portion by correcting coordinates of that point on the scanning line which corresponds to the crossing point based on the inclination angle, thereby making the light/dark border point as the reference point.

4. A method of adjusting an optical axis of a headlight according to claim 1 or 2, further comprising the steps of:

obtaining a maximum illuminance of the curve; and obtaining a position of a light/dark border point which defines a border between the light portion and the dark portion by correcting coordinates of that point on the scanning line which corresponds to the crossing point based on the maximum illuminance, thereby making the light/dark border point as the reference point.

5. A method of adjusting an optical axis of a headlight of a vehicle comprising:

picturing that illuminating pattern of the headlight which appears on a screen disposed in front of the vehicle; and adjusting the optical axis of the headlight based on an image of the illuminating pattern;

wherein the improvement comprises:

measuring a distribution of illuminance of the illuminating pattern along a scanning line which bridges a light portion and a dark portion of the image of the illuminating pattern;

obtaining a position of a reference point which serves as a reference in adjusting the optical axis from that point on the scanning line which attains a predetermined ratio of illuminance relative to a maximum value of illuminance of the measured illuminance; and changing the ratio depending on a rate of change in illuminance.

6. A method of adjusting an optical axis of a headlight according to claim 5, wherein the ratio is calculated with an inclination of a straight line as a parameter to show the rate of change, said straight line being obtained at a portion corresponding to a transient region which is positioned between the light portion and the dark portion of a curve representing the measured distribution of illuminance.

* * * * *